(12) United States Patent
AlShammari

(10) Patent No.: US 11,859,754 B2
(45) Date of Patent: Jan. 2, 2024

(54) PIPELINE PROFILER

(71) Applicant: SAUDI ARABIAN OIL COMPANY, Dhahran (SA)

(72) Inventor: Saud Aqeel Saud AlShammari, Al Jubail (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 257 days.

(21) Appl. No.: 17/018,222

(22) Filed: Sep. 11, 2020

(65) Prior Publication Data

US 2022/0082198 A1 Mar. 17, 2022

(51) Int. Cl.
| | |
|---|---|
| *F16L 55/44* | (2006.01) |
| *G01B 5/20* | (2006.01) |
| *G01M 3/00* | (2006.01) |
| *F16L 55/38* | (2006.01) |
| *F16L 55/48* | (2006.01) |
| *F16L 101/30* | (2006.01) |

(52) U.S. Cl.
CPC ............... *F16L 55/44* (2013.01); *G01B 5/20* (2013.01); *G01M 3/005* (2013.01); *F16L 2101/30* (2013.01)

(58) Field of Classification Search
CPC ....... F16L 55/44; F16L 2101/30; F16L 55/38; F16L 55/48; G01B 5/20; G01M 3/005
See application file for complete search history.

(56) References Cited

U.S. PATENT DOCUMENTS

| | | | |
|---|---|---|---|
| 3,786,684 | A | 1/1974 | Wiers et al. |
| 3,882,606 | A | 5/1975 | Kaenel et al. |
| 4,945,775 | A | 8/1990 | Adams et al. |
| 4,953,412 | A | 9/1990 | Rosenberg et al. |

(Continued)

FOREIGN PATENT DOCUMENTS

| | | | |
|---|---|---|---|
| CN | 105003790 A | * | 10/2015 |
| CN | 106855410 A | | 6/2017 |

(Continued)

OTHER PUBLICATIONS

Sadovnychiy, S. et al., "Correction Methods and Algorithms for Intertial Navigation System Working Inside of Pipelines", Fourth Congress of Electronics, Robotics and Automotive Mechanics, IEEE Computer Society, Oct. 2007, pp. 625-630 (6 pages).

(Continued)

*Primary Examiner* — Herbert K Roberts
*Assistant Examiner* — Anthony W Megna Fuentes
(74) *Attorney, Agent, or Firm* — Osha Bergman Watanabe & Burton LLP

(57) ABSTRACT

A pipeline profiler includes an elongated body and a plurality of mechanical arms projecting radially about the elongated body. Each mechanical arm has an adjustable angle bracket shape and a hinge joint formed at a corner of the adjustable angle bracket shape. Odometers to measure a travel distance of the elongated body are coupled to the mechanical arms at the hinge joints of the mechanical arms. Motion devices are coupled to the elongated body to detect the azimuth and inclination of the elongated body. To obtain a profile of a pipeline, the pipeline profiler is attached to a pig that is movable through the pipeline by a fluid pressure in the pipeline.

16 Claims, 11 Drawing Sheets

(56) References Cited

U.S. PATENT DOCUMENTS

| | | |
|---|---|---|
| 6,170,344 B1 | 1/2001 | Ignagni |
| 6,768,959 B2 | 7/2004 | Ignagni |
| 7,246,031 B2 | 7/2007 | Boudreaux |
| 9,138,786 B2 | 9/2015 | McKay et al. |
| 2003/0233894 A1* | 12/2003 | Tezuka .................. E21B 47/024 73/866.5 |
| 2015/0240985 A1 | 8/2015 | Soliman |

FOREIGN PATENT DOCUMENTS

| | | | |
|---|---|---|---|
| CN | 108612959 A | 10/2018 | |
| DE | 3231137 A1 | 2/1984 | |
| DE | 4205113 C1 * | 4/1993 | ............. B29C 35/10 |
| EP | 1362979 A2 | 11/2003 | |
| GB | 1508807 A | 4/1978 | |
| GB | 2226633 A | 7/1990 | |
| GB | 2305989 A | 4/1997 | |
| GB | 2394549 A | 4/2004 | |
| JP | 2008076907 A | 4/2008 | |
| WO | 199932902 A2 | 7/1999 | |
| WO | 2020151363 A1 | 7/2020 | |

OTHER PUBLICATIONS

Chen, Qijin et al., "Positioning Accuracy of a Pipeline Surveying System Based on MEMS IMU and Odemeter: Case Study", IEEE Access, vol. 7, Aug. 2019, pp. 104453-104461 (9 pages).

Abbasi, Wasal Ahmed, "Analysis of the Factors that affect the target depth in deviated wells", Master's Thesis, University of Stavanger: Faculty of Science and Technology, Jun. 2013 (83 pages).

Wang, Zhuo et al., "Development of a Position Measuring Device of a Deep-Sea Pipeline Based on Flange Center Positioning", Journal of Marine Science and Engineering, MDPI, vol. 8, No. 86, Feb. 2020 (15 pages).

International Search Report and Written Opinion of the International Searching Authority issued in corresponding International Application No. PCT/US2020/055324, dated May 10, 2021 (44 pages).

* cited by examiner

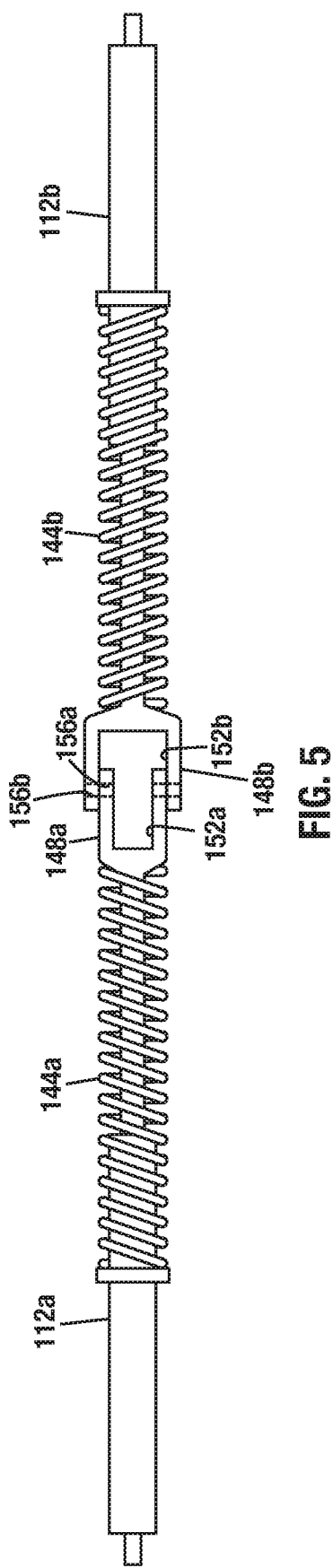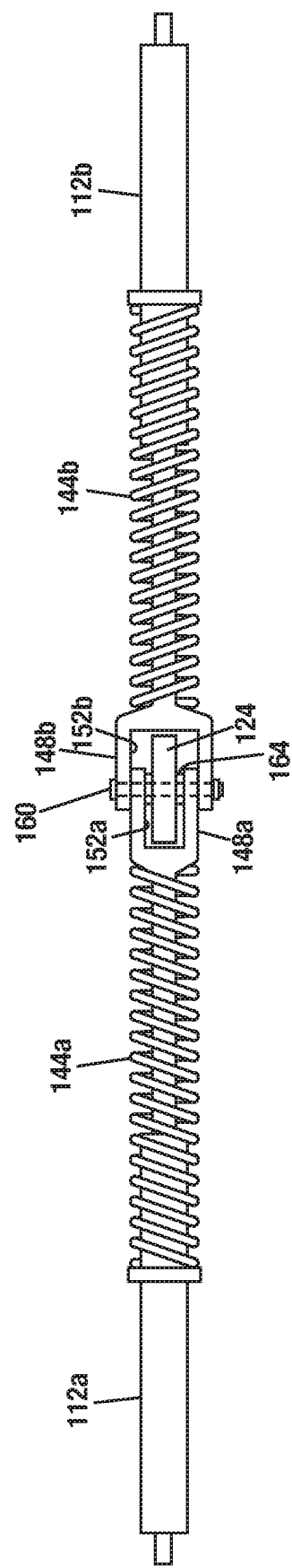

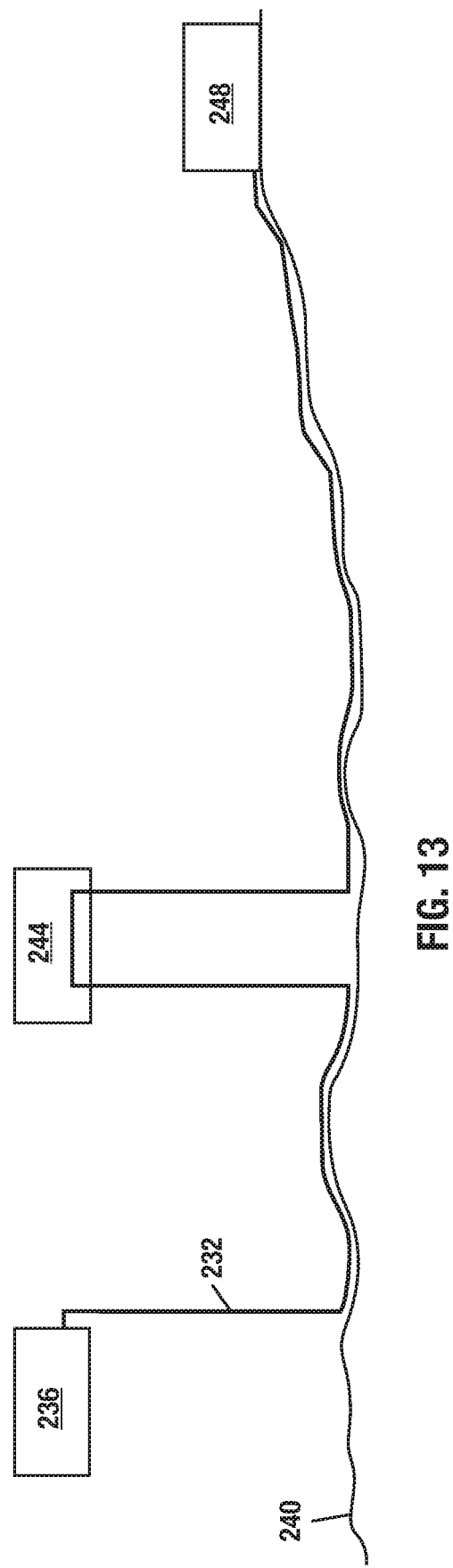

PIPELINE PROFILER

BACKGROUND

Thousands of miles of pipelines are used to carry unrefined hydrocarbons from production sites to refineries and to carry refined hydrocarbon products from refineries to storage or distribution stations. These pipelines may be buried underground or laid on a seabed and are accessible through various pumping stations positioned in the pipeline network. After pipelines are installed, the pipelines may shift in position over time. This shifting affects both the coordinates of the pipelines and the profiles of the pipelines and should be factored into models that are used to manage the pipelines. Hydrographic surveys can be used to accurately determine the position of offshore pipelines. However, hydrographic surveys are too expensive to be deployed often.

Pipelines need to be maintained to ensure that there are no leakages that can pose health and environmental risks and to ensure that the pipelines are operating efficiently. Pigs are typically used in maintenance of pipelines. Pigs are devices that can be launched into a pipeline from a pumping station and propelled along the pipeline without stopping flow of product through the pipeline. While in the pipeline, pigs can perform various tasks depending on their configuration. Examples of tasks that could be performed include removing unwanted material from the pipeline, making measurements in the pipeline to assess the condition of the pipeline, and making repairs in the pipeline. The ability to measure the position of a pipeline during pigging may drop the requirement for costly hydrographic surveys after pipeline installation.

Japanese Patent Publication No. 2008076907A describes an inspection pig composed of a car train including two connected pigs. A distance meter that rolls in the pipeline is provided on the body of the front pig. Expandable/contractible wheels supported by springs are installed in the rear pig. In addition, a gyro of a triaxial bearing measurement instrument, a control device, and a data processor/recorder are installed in the rear pig. The inspection pig is inserted into the pipeline from a launcher. While the inspection pig is moving through the pipeline, the inspection pig measures the azimuth and distance of the three axes. After removing the inspection pig from the pipeline, the data collected by the pig are transferred to a computer. A 3D profile coordinate based on the profile data of the pipeline, with the launcher as a base point, is obtained from the azimuth and distance data.

SUMMARY

In a first summary example, a pipeline profiler includes an elongated body and a plurality of mechanical arms projecting radially about the elongated body. Each mechanical arm has an adjustable angle bracket shape and a hinge joint formed at a corner of the adjustable angle bracket shape. The pipeline profiler includes a plurality of odometers to measure a travel distance of the elongated body. Each odometer is coupled to one of the mechanical arms at the respective hinge joint of the mechanical arm. The pipeline profiler includes a first motion device that is coupled to the elongated body to detect an azimuth of the elongated body and a second motion device that is coupled to the elongated body to detect an inclination of the elongated body.

Each mechanical arm of the pipeline profiler may include a first linearly adjustable arm and a second linearly adjustable arm arranged to form the adjustable angle bracket shape. First ends of the first linearly adjustable arm and the second linearly adjustable arm may be coupled together by the respective hinge joint of the mechanical arm. Second ends of the first linearly adjustable arm and the second linearly adjustable arm may be pivotally coupled to the elongated body at spaced apart locations along the elongated body. The first linearly adjustable arm of each mechanical arm may include a first rod slidably received within a first cylinder and a first spring arranged to bias the first rod to an extended length out of the first cylinder. The second linearly adjustable arm of each mechanical arm may include a second rod slidably received within a second cylinder and a second spring arranged to bias the second rod to an extended length out of the second cylinder. A first coupling may be formed at an end of each first rod extended out of the respective first cylinder. A second coupling may be formed at an end of each second rod extended out of the respective second cylinder. The hinge joint of the respective mechanical arm may be formed between the first coupling and the second coupling. A pin may be supported by the first and second couplings of the first and second linearly adjustable arms of each mechanical arm. The odometer coupled to the mechanical arm may be rotatably mounted on the pin.

The first motion device may include a tri-axis accelerator. The second motion device may include a tri-axis gyroscope.

The pipeline profiler may include a signal processing circuit disposed in the elongated body and in signal communication with the odometers, the first motion device, and the second motion device. The pipeline profiler may include a data storage circuit disposed in the elongated body and in communication with the signal processing circuit.

The pipeline profiler may include a coupling attached to an end of the elongated body for coupling the elongated body to a pig.

In a second summary example, a pipeline profiling system includes a pig that is movable through a pipeline by a fluid pressure in the pipeline and an elongated body coupled to the pig by a flexible joint. The system includes a plurality of mechanical arms projecting radially about the elongated body. Each mechanical arm has an adjustable angle bracket shape and a hinge joint formed at a corner of the adjustable angle bracket shape. The system includes a plurality of odometers to measure a travel distance of the elongated body. Each odometer is coupled to one of the mechanical arms at the hinge joint of the mechanical arm. The system includes a first motion device coupled to the elongated body to detect an azimuth of the elongated body. The system includes a second motion device coupled to the elongated body to detect an inclination of the elongated body.

The pig may be a utility pig. Each mechanical arm of the pipeline profiling system may include a first linearly adjustable arm and a second linearly adjustable arm arranged to form the adjustable angle bracket shape. First ends of the first linearly adjustable arm and the second linearly adjustable arm of each mechanical arm may be coupled together by the respective hinge joint of the mechanical arm. Second ends of the first linearly adjustable arm and the second linearly adjustable arm of each mechanical arm may be pivotally coupled to the elongated body at spaced apart locations along the elongated body. The first linearly adjustable arm of each mechanical arm may include a first rod slidably received within a first cylinder and a first spring arranged to bias the first rod to an extended length out of the first cylinder. The second linearly adjustable arm of each mechanical arm may include a second rod slidably received within a second cylinder and a second spring arranged to bias the second rod to an extended length out of the second cylinder. First couplings may be formed at the ends of the first rods extended out of their respective first cylinders. Second couplings may be formed at the ends of the second rods extended out of their respective second cylinders. The hinge joints of the mechanical arms may be formed between the respective first and second couplings. A pin may be supported by the first and second couplings of the first and second linearly adjustable arms of each mechanical arm. Each odometer coupled to one of the mechanical arms may be rotatably mounted on the respective pin of the mechanical arm.

In a third summary example, a method of profiling a pipeline includes coupling a pig to an elongated body of a pipeline profiler and inserting the pig and the pipeline profiler into the pipeline. The method includes engaging an inner wall of the pipeline by a plurality of odometers coupled to the elongated body by a plurality of mechanical arms projecting radially about the elongated body and having adjustable angle bracket shapes. The method includes propelling the pig and the pipeline profiler along the pipeline by a fluid pressure in the pipeline. During propelling the pig, the method includes measuring a distance traveled by the pipeline profiler by the plurality of odometers, detecting an acceleration of the pipeline profile by a first motion device coupled to the elongated body, and detecting an orientation of the pipeline profiler by a second motion device coupled to the elongated body.

The method may include determining a profile of the pipeline from outputs of the odometers, first motion device, and second motion device. The method may include scraping the inner wall of the pipeline by the pig during the propelling.

The foregoing general description and the following detailed description are exemplary of the invention and are intended to provide an overview or framework for understanding the nature of the invention as it is claimed. The accompanying drawings are included to provide further understanding of the invention and are incorporated in and constitute a part of the specification. The drawings illustrate various embodiments of the invention and together with the description serve to explain the principles and operation of the invention.

BRIEF DESCRIPTION OF DRAWINGS

The following is a description of the figures in the accompanying drawings. In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

FIG. 5 is a schematic diagram illustrating a coupling of the linearly adjustable arm of FIG. 3 received in a slot of a coupling of the linearly adjustable arm of FIG. 4.

FIG. 6 is a schematic diagram illustrating a hinge joint formed between the linearly adjustable arms of FIGS. 3 and 4.

FIG. 13 is a schematic diagram of a pipeline profile.

DETAILED DESCRIPTION

Figure 1:
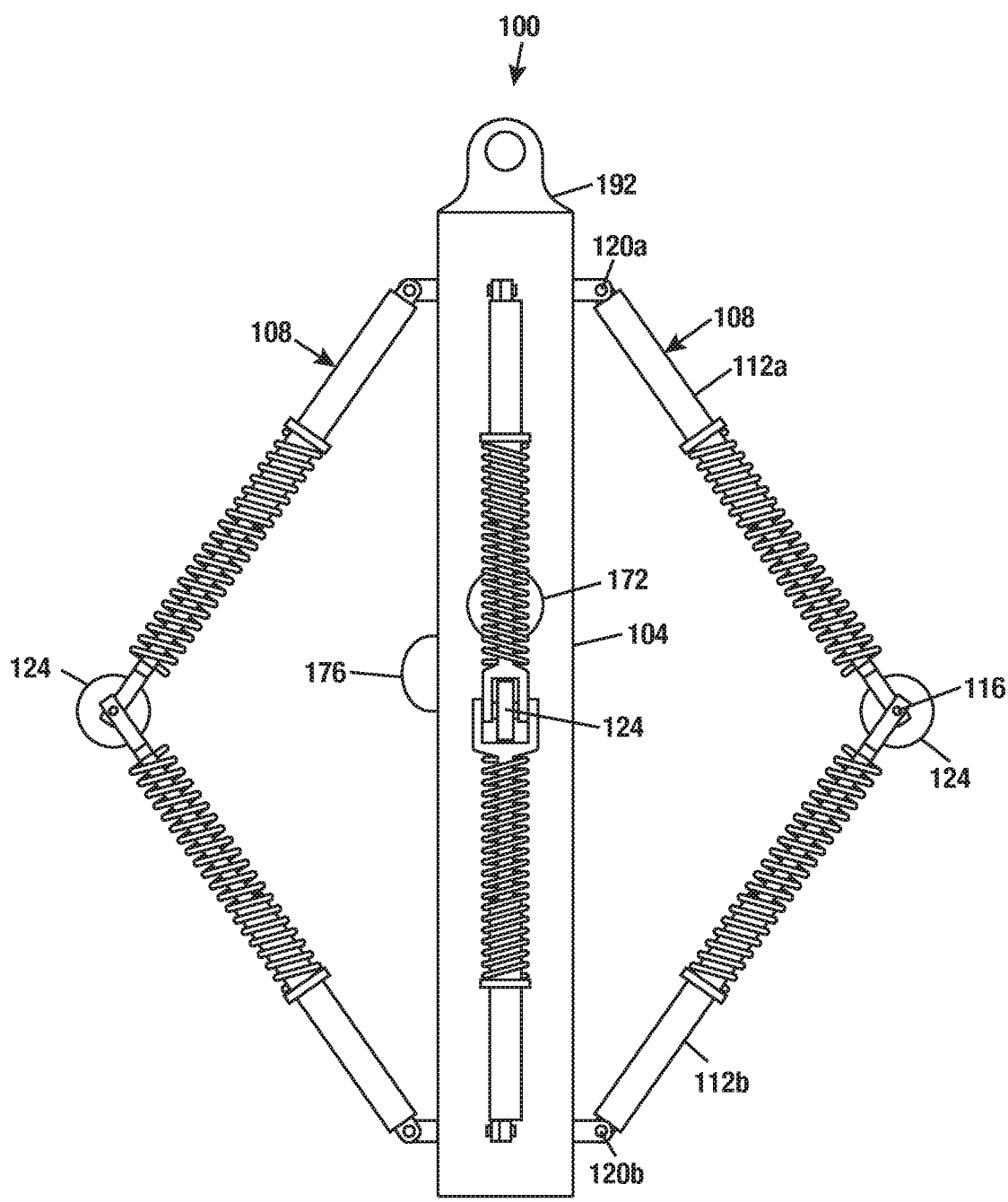
FIG. 1 is an elevated view of a pipeline profiler.

In the following detailed description, certain specific details are set forth in order to provide a thorough understanding of various disclosed implementations and embodiments. However, one skilled in the relevant art will recognize that implementations and embodiments may be practiced without one or more of these specific details, or with other methods, components, materials, and so forth. In other instances, related well known features or processes have not been shown or described in detail to avoid unnecessarily obscuring the implementations and embodiments. For the sake of continuity, and in the interest of conciseness, same or similar reference characters may be used for same or similar objects in multiple figures.

A pipeline profiler that provides direct measurements of a pipeline profile on the topography of the Earth's surface is described herein. The pipeline profiler may be used to measure a pipeline profile of onshore or offshore pipelines transporting hydrocarbon products. The pipeline profiler may be launched into the pipeline network during scraping activities to avoid inducing disturbances to production of products. The pipeline profile obtained from the measurements made by the pipeline profiler may be used in field models to improve accuracy of the models, predict the flow regime in the pipelines at different scenarios, optimize scraping frequency of the pipelines to minimize production upsets, and identify bottlenecks in the pipeline network.

Figure 2:
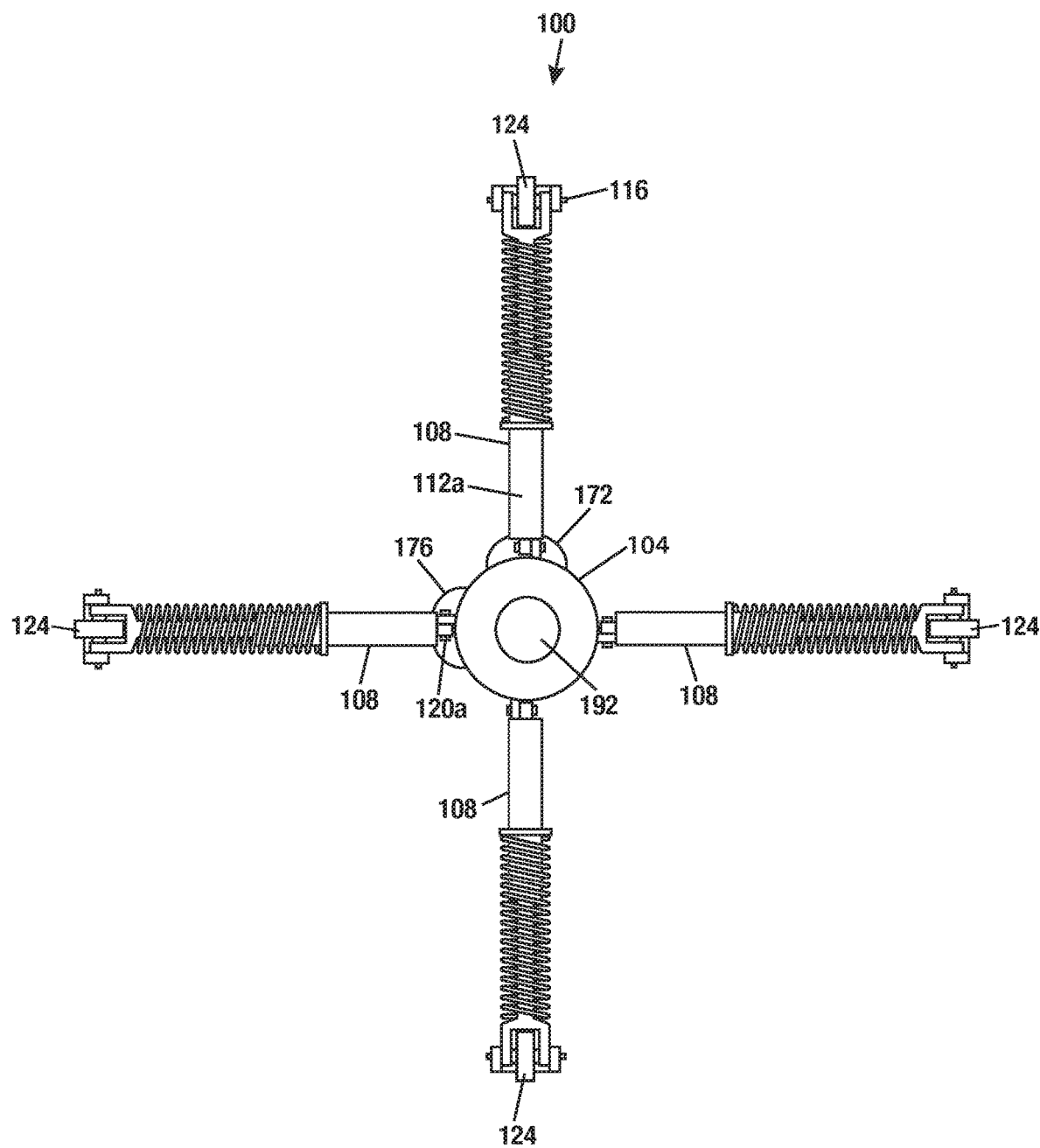
FIG. 2 is an end view of the pipeline profiler of FIG. 1.

FIGS. 1 and 2 show one illustrative implementation of a pipeline profiler 100 that may be used to obtain direct measurements of a pipeline profile. Pipeline profiler 100 includes a profiler body 104, which in the illustrated example is an elongated body, such as a generally cylindrical body. Profiler body 104 may be made of a metal or a metal alloy or other material that can withstand the environment of use. A plurality of mechanical arms 108 are attached radially about profiler body 104. In the illustrated example, four mechanical arms 108 are attached radially about profiler body 104. In general, two to eight mechanical arms 108 may be attached radially about profiler body 104. Mechanical arms 108 may be evenly spaced apart along a circumference of profiler body 104. Each mechanical arm 108 includes two linearly adjustable arms 112a, 112b arranged to form an angle bracket shape. The term "linearly adjustable arm" means that the length of the arm is adjustable in a linear direction. The outer ends of linearly adjustable arms 112a, 112b are coupled together by a hinge joint 116, which is located at the corner of the angle bracket shape. The inner ends of linearly adjustable arms 112a, 112b are coupled to profiler body 104 at two axially spaced apart positions by pivot joints 120a, 120b. Each mechanical arm 108 carries a distance measuring wheel (or odometer) 124 at hinge joint 116. The lengths of linearly adjustable arms 112a, 112b are adjustable to position hinge joint 116 and odometer 124 at a desired radius from an axial centerline of profiler body 104.

Figure 3:
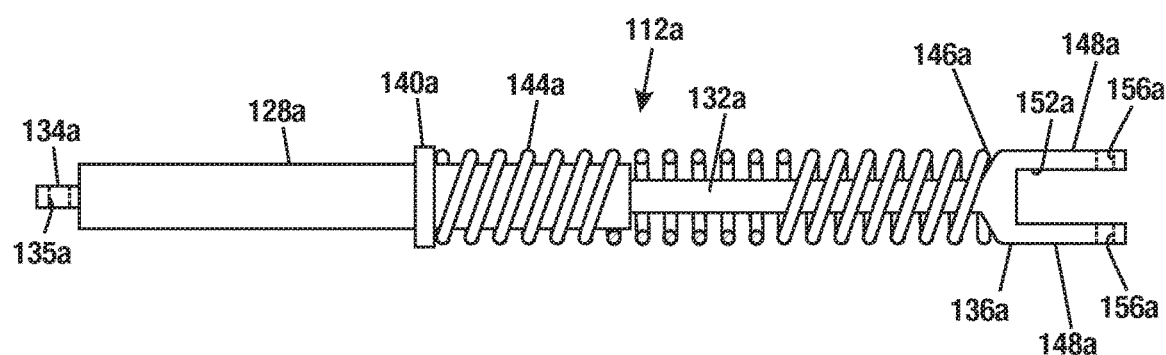
FIG. 3 is a schematic diagram of a linearly adjustable arm.

Referring to FIG. 3, in one example, linearly adjustable arm 112a may include a cylinder 128a and a rod 132a received inside cylinder 128a. Rod 132a is slidable relative to cylinder 128a to extend or shorten the length of linearly adjustable arm 112a. A flange 134a may be formed at an end of cylinder 128a for attaching linearly adjustable arm 112a to profiler body 104 (in FIGS. 1 and 2). Flange 134a may include a hole 135a to receive a pin. A coupling 136a is formed at an end of rod 132a that extends outside of cylinder 128a. A compression spring 144a is arranged to bias rod 132a in an outward direction. In one example, such arrangement may include a collar 140a on an outer diameter of cylinder 128a at a position intermediate between the ends of cylinder 128a and a shoulder 146a at the transition between rod 132a and coupling 136a. The arrangement may include disposing compression spring 144a on linearly adjustable arm 112a and between collar 140a and shoulder 146a. Spring 144a will abut collar 140a at one end and shoulder 146a at another end. In the rest state (uncompressed state) of spring 144a, linearly adjustable arm 112a has the longest length (or the extension length of rod 132a out of cylinder 128a is maximum). The length of linearly adjustable arm 112a can be shortened by applying a force to displace rod 132a into cylinder 128a and compress spring 144a. Cylinder 128a and rod 132a, as well as flange 134a and collar 140a, may be made of a metal or a metal alloy or other material that can withstand the environment of use.

Figure 4:
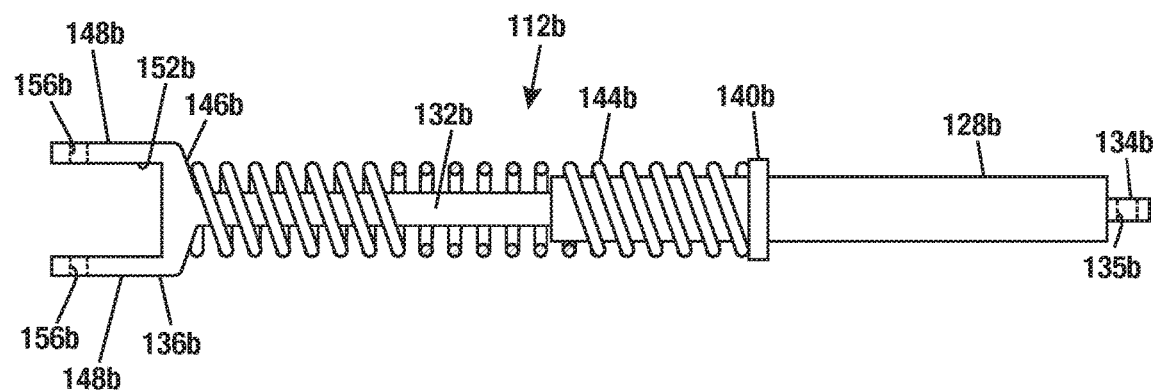
FIG. 4 is a schematic diagram of another linearly adjustable arm.

Linearly adjustable arm 112b (in FIGS. 1 and 2) may have a similar structure to linearly adjustable arm 112a. As shown in FIG. 4, linearly adjustable arm 112b may include a cylinder 128b and a rod 132b received inside cylinder 128b and slidable relative to cylinder 128a, a coupling 136b formed at an end of rod 132b extending outside of cylinder 128b, and a compression spring 144b arranged to bias rod 132b in an outward direction. Spring 144b may be arranged between a collar 140b on cylinder 128b and a shoulder 146b between rod 132b and coupling 136b, as previously described for linearly adjustable arm 112a (in FIG. 3). In the rest state of spring 144b, linearly adjustable arm 112b has the longest length (or the extension length of rod 132b out of cylinder 128b is maximum). The length of linearly adjustable arm 112b can be shortened by applying a force to displace rod 132b into cylinder 128b and compress spring 144b. A flange 134b may be formed at an end of cylinder 128b for attaching linearly adjustable arm 112b to profiler body 104 (in FIGS. 1 and 2). Flange 134b may include a hole 135b to receive a pin. Cylinder 128b and rod 132b, as well as flange 134b and collar 140b, may be made of a metal or a metal alloy or other material that can withstand the environment of use.

Returning to FIG. 3, coupling 136a includes two spaced apart flanges 148a defining a slot 152a that is aligned with rod 132a and cylinder 128a along an axial axis of linearly adjustable arm 112a. Flanges 148a have holes 156a that are aligned in a direction transverse to the axial axis of linearly adjustable arm 112a. Slot 152a has a width to accommodate an axial thickness of odometer 124 (in FIGS. 1 and 2). Similarly, as shown in FIG. 4, coupling 136b includes two spaced apart flanges 148b defining a slot 152b that is aligned with rod 132b and cylinder 128b along an axial axis of linearly adjustable arm 112b. Flanges 148b have holes 156b that are aligned in a direction transverse to the axial axis of linearly adjustable arm 112b. Slot 152b has a width to accommodate coupling flanges 148a of linearly adjustable arm 112a, as shown in FIG. 5. Flanges 148a of linearly adjustable arm 112a can be disposed in slot 152b such that holes 156a in flanges 148a and holes 156b in flanges 148b are aligned.

FIG. 6 shows odometer 124 disposed in an opening formed by slots 152a and 152b. Odometer 124 has a central hole that can be aligned with holes 156a, 156b (in FIGS. 3 and 4) in flanges 148a, 148b. A hinge pin 160 is inserted through the holes in flanges 148a, 148b and the central hole in odometer 124, forming a hinge joint (116 in FIGS. 1 and 2). Hinge pin 160 is secured in place, e.g., by means of a fastener. Hinge pin 160 allows linearly adjustable arms 112a, 112b to pivot relative to each other. When odometer 124 contacts a surface, such as an inner wall of a pipeline, odometer 124 can roll along the surface by rotating about hinge pin 160. Spacers 164 may be provided on hinge pin 160 and between flanges 148a and odometer 124 to reduce friction between adjacent surfaces of odometer 124 and flanges 148a. Spacers 164 may be made of antifriction material.

Figure 7:
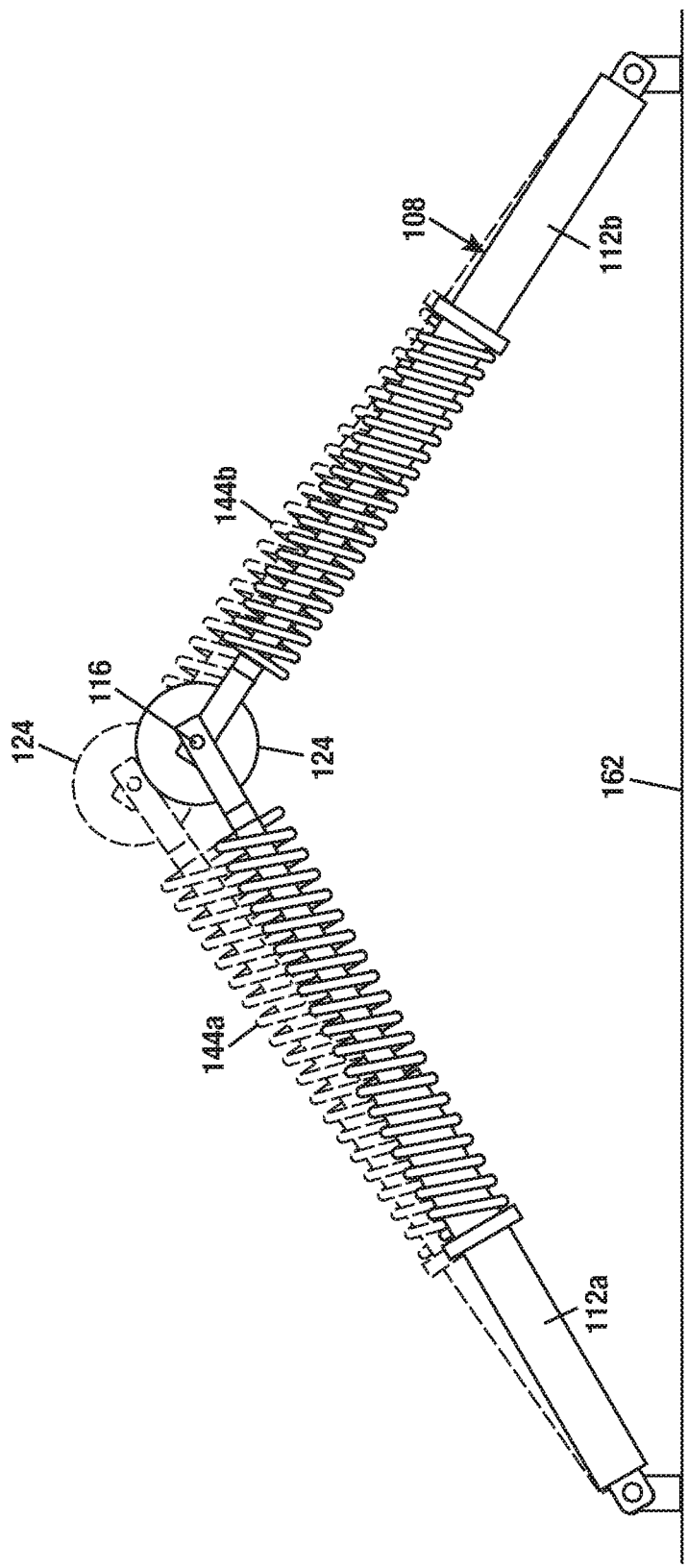
FIG. 7 is a schematic diagram the linearly adjustable arms of FIGS. 3 and 4 pivoted about a hinge joint to form an angle bracket shape.

FIG. 7 shows linearly adjustable arms 112a, 112b pivoted relative to each other at hinge joint 116 to form the angle bracket shape of mechanical arm 108. For illustrative purposes, two example positions of mechanical arm 108 resulting in different distances between odometer 124 and a datum 162 are shown in FIG. 7. The position indicated by dashed lines may be the full length of each of linearly adjustable arms 112a, 112b, i.e., the rest state of compression springs 144a, 144b. The position indicated by solid lines may be a shortening of the length of at least one of linearly adjustable arms 112a, 112b and compression of the respective compression spring, as previously explained.

Returning to FIGS. 1 and 2, pipeline profiler 100 includes a device 172 mounted on profiler body 104 to measure a horizontal angle (or azimuth) of profiler body 104 as profiler body 104 traverses a pipeline. Pipeline profiler 100 includes a device 176 mounted on profiler body 104 to measure a vertical angle (or inclination) of profiler body 104 as profiler body 104 traverses a pipeline. Azimuth is measured with respect to true north. Inclination is measured with respect to the vertical. Device 172 may be, for example, a tri-axis MEMS gyroscope, which will sense the angular rotation of profiler body 104 around three orthogonal axes. The z axis of the gyroscope may be aligned with the axial axis of profiler body 104. Device 176 may be, for example, a tri-axis accelerometer, which will measure linear acceleration of profiler body 104 in three axes. The z axis of the accelerometer may be transverse to the axial axis of profiler body 104. In some cases, devices 172 and 176 may be integrated into an inertial measurement unit (IMU) that can be mounted within profiler body 104.

Figure 8:
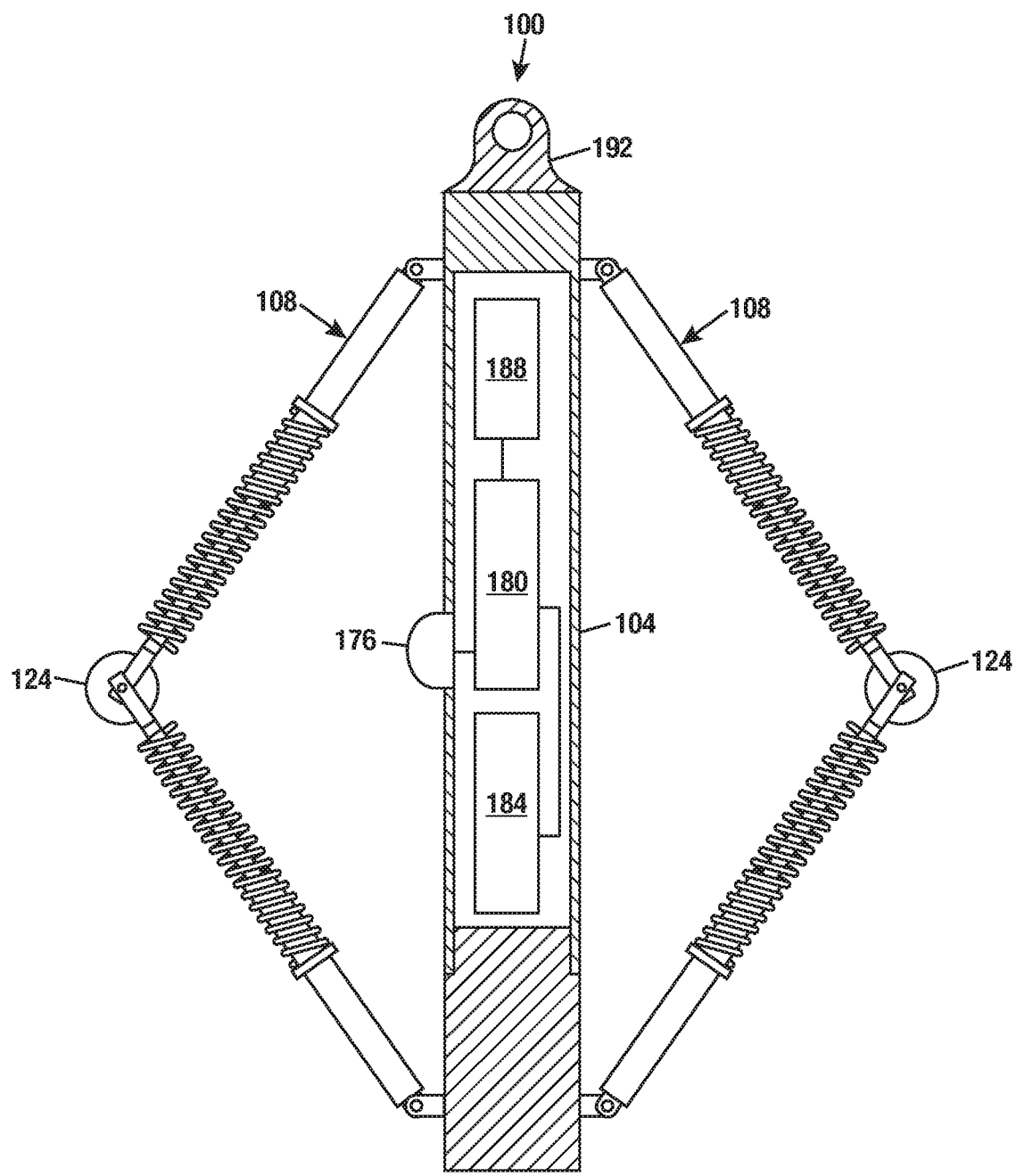
FIG. 8 is a cross-sectional view of the pipeline profiler of FIG. 1.

Referring to FIG. 8, profiler body 104 may contain an electronics module including, for example, a signal processing circuit 180, a data storage circuit 184, and a power source 188. Signal processing circuit 180 may include a processor and memory. Signal processing circuit 180 may be configured with, for example, CMOS, microcontroller, digital signal processor (DSP), field programmable gate array (FGPA), application-specific integrated circuit (ASIC), complex programmable logic device (CPLD), or a system-on-chip (SoC). Signal processing circuit 180 may receive signals representative of measured distance from odometer 124, signals representative of the azimuth of profiler body 104 from device 172, and signals representative of the inclination of profiler body 104 from device 176. Signal processing circuit 180 may process the signals and store the measurement data contained in the processed signals in data storage circuit 184. Data storage circuit 184 may be any non-transitory computer-readable storage medium. Signal processing circuit 180 and data storage circuit 184 are powered by power source 188, which may be a battery or supercapacitor. Signal processing circuit 180 may manage distribution of power.

Figure 9:
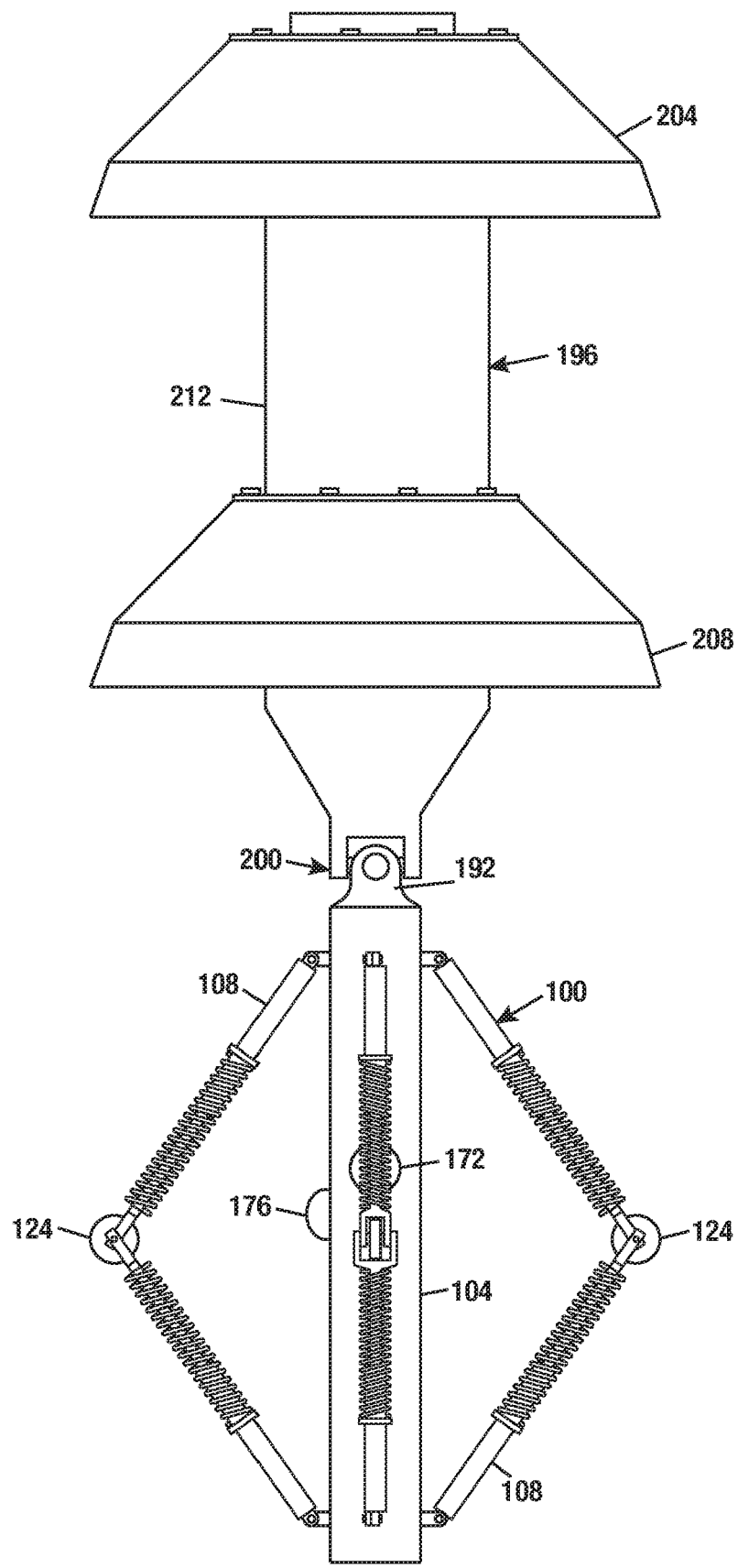
FIG. 9 is a schematic diagram illustrating the pipeline profiler of FIG. 1 coupled to a pig.

Pipeline profiler 100 includes a coupling 192 at an end of profiler body 104 to use in forming a joint between profiler body 104 and a pig. FIG. 9 shows profiler body 104 coupled to a pig 196 by a flexible joint 200. Joint 200 may be a universal joint, for example, to allow bending of the joint along a curvature of a pipeline. In one example, pig 196 is a utility pig that is used to clean a pipeline bore. In the illustrated example, pig 196 includes seal cups 204, 208 mounted on a pig body (or mandrel) 212. Seal cups 204, 208 seal against an inside diameter of a pipeline and scrape debris off the inner wall surface of the pipeline while moving through the pipeline. Pig 196 is only one example of utility pig and is not intended to be limiting. For example, seal discs may be used instead of or in addition to seal cups. In addition, wire bristles and other elements to scrape debris from a surface of a pipe may be carried by pig body 212. Pig 196 is illustrated as a mandrel pig. Other types of utility pigs, such as foam pigs and solid cast pigs, may be used instead of mandrel pigs. In other cases, pipeline profiler 100 may be coupled to a pig other than a utility pig.

Figure 10:
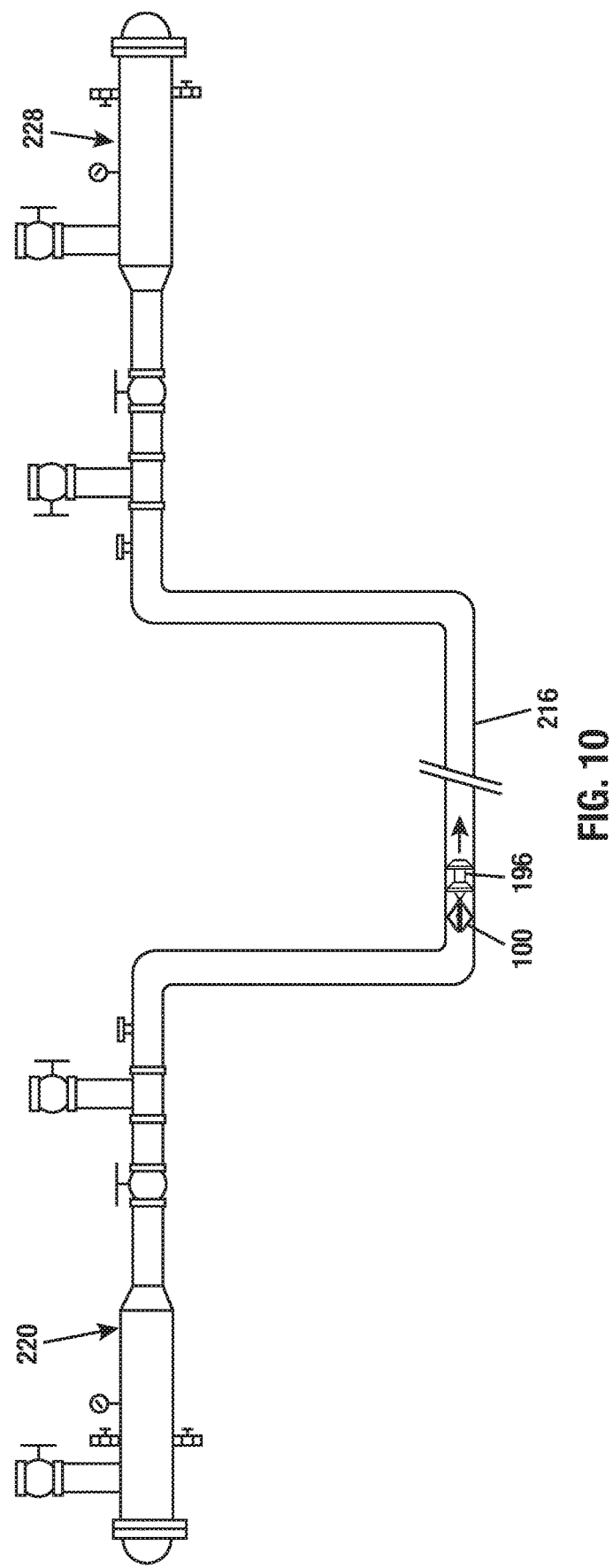
FIG. 10 is a schematic diagram showing launching of the pig and pipeline profiler of FIG. 9 into a pipeline.
Figure 11:
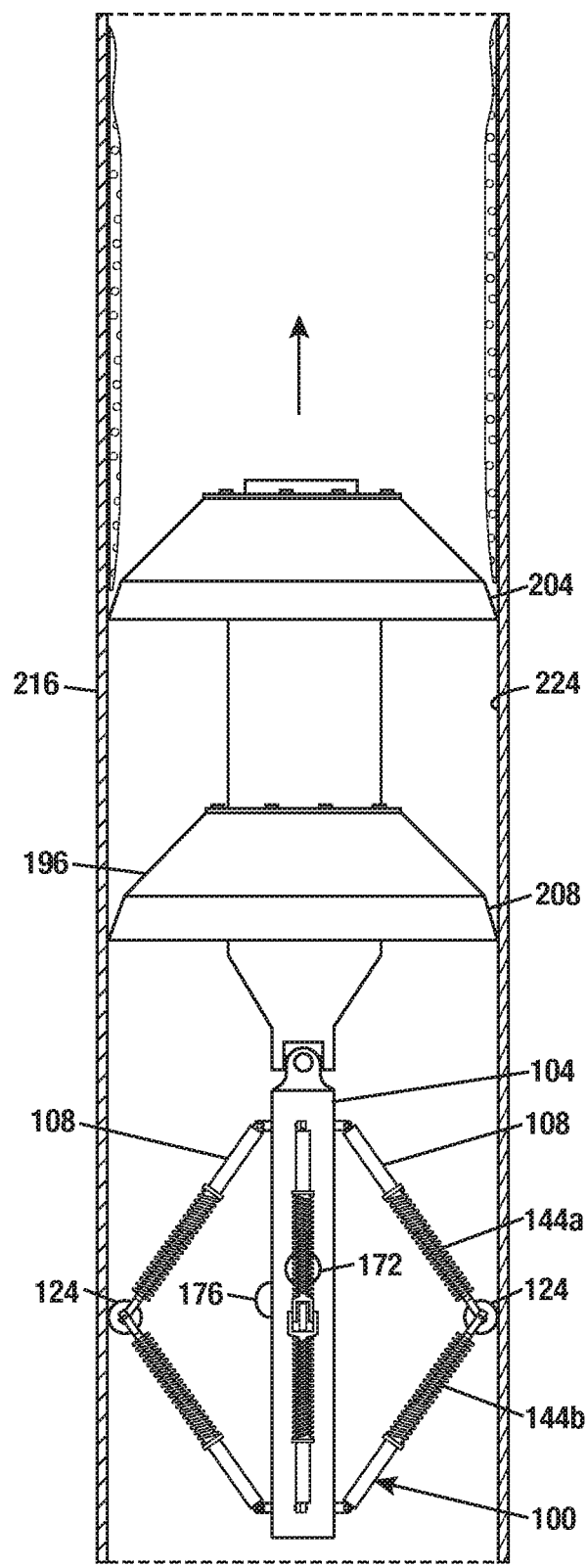
FIG. 11 is a schematic diagram illustrating the pig and pipeline profiler of FIG. 9 in a section of a pipeline.
Figure 12:
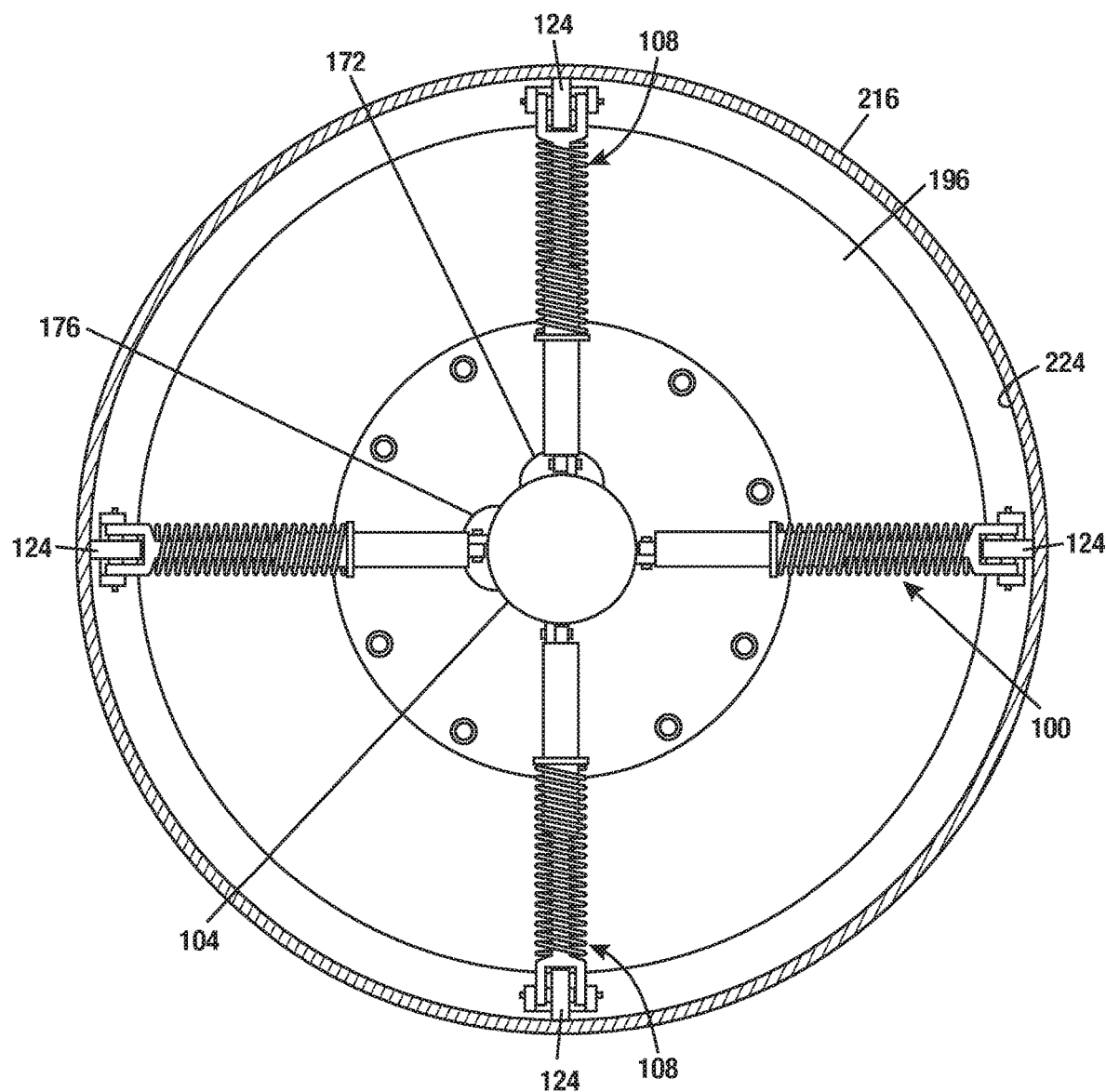
FIG. 12 is an end view of the cross-sectional view shown in FIG. 11.

Referring to FIG. 10, pig 196 and pipeline profiler 100 can be inserted into a pipeline 216 via a pipeline pig launcher 220, which would be located at a pumping station. Pig 196 will be propelled along pipeline 216 by fluid pressure in pipeline 216, pulling pipeline profiler 100 along. FIGS. 11 and 12 show pig 196 and pipeline profiler 100 in a section of pipeline 216. As pig 196 is propelled along pipeline 216, seal cups 204, 208 engage the inner wall 220 of pipeline 196 and scrape debris from the inner wall. Seal cups 204, 208 will also push the debris along pipeline 216. Odometers 124 of pipeline profiler 100 roll along inner wall 220 of pipeline 216 with motion of pig 196. Springs 144*a*, 144*b* carried by mechanical arms 108 of pipeline profiler 100 bias odometers 124 into contact with inner wall 220 of pipeline 216. The angle bracket shape of the mechanical arms 108 means that mechanical arms 108 will not recline back to be flat against profiler body 104 as pipeline profiler 100 is pulled along the pipeline by pig 196. In addition, the slim profile of profiler body 104 and the long mechanical arms 108 with the spring-loaded adjustable arms allow pipeline profiler 100 to be more flexible and adaptable to the inner profile of the pipeline.

As odometers 124 roll along inner wall 224 of pipeline 216, odometers 124 generate distance measurement signals that are received by the electronics module inside profiler body 104 of pipeline profiler. Simultaneously, devices 172, 176 measure azimuth and inclination of profiler body 104 and generate corresponding measurement signals that are received by the electronics module. The electronics module stores the measurement data. Pig 196 and pipeline profiler 100 can be retrieved from a pig receiver (228 in FIG. 10) at a pumping station. After retrieving pipeline profiler 100 from the pig receiver, the measurement data stored inside pipeline profiler 100 are retrieved and processed on a computer. Using the launch point of pig 196 as datum, the pipeline profile can be calculated from the measurement data (distance measurements, azimuth measurements, and inclination measurements) using either curvature radius method or minimum curvature method. The output will be x, y, z coordinates along the pipeline. Curvature radius and minimum curvature methods are known in the drilling art, e.g., in the context of determining borehole trajectories.

FIG. 13 shows an example of a pipeline profile 232 that may be generated using data collected by the pipeline profiler. Pipeline profile 232 begins at a platform 236, passes through a tie-in platform 244, and ends at a plant 248. Pipeline profile 232, platforms 236, 244, and plant 248 are shown relative to a seabed 240. Platform 236 may be, for example, a structure with wells, pipelines of the wells, and surface equipment for the wells. Tie-in platform 244 may be, for example, a structure that connects pipelines of several platforms into a larger pipeline that routes the fluid production to the plant.

The detailed description along with the summary and abstract are not intended to be exhaustive or to limit the embodiments to the precise forms described. Although specific embodiments, implementations, and examples are described herein for illustrative purposes, various equivalent modifications can be made without departing from the spirit and scope of the disclosure, as will be recognized by those skilled in the relevant art.

The invention claimed is:

1. An apparatus comprising:
   a cylindrical elongated body;
   a plurality of mechanical arms attached radially about the cylindrical elongated body, each mechanical arm having an adjustable angle bracket shape and a hinge joint formed at a corner of the adjustable angle bracket shape;
   a plurality of odometers to measure a travel distance of the cylindrical elongated body, each odometer coupled to one of the plurality of mechanical arms at the respective hinge joint of the mechanical arm;
   a first motion device mounted on the cylindrical elongated body to detect an azimuth of the cylindrical elongated body; and
   a second motion device mounted on the cylindrical elongated body to detect an inclination of the cylindrical elongated body;
   wherein the plurality of mechanical arms carry elements that bias the plurality odometers away from the cylindrical elongated body,
   wherein each mechanical arm comprises a first linearly adjustable arm and a second linearly adjustable arm arranged to form the adjustable angle bracket shape,
   wherein a first end of the first linearly adjustable arm and a first end of the second linearly adjustable arm of each mechanical arm:
      are coupled together by the respective hinge joint of the mechanical arm, and
      pivot relative to each other at the respective hinge joint of the mechanical arm, and
   wherein a second end of the first linearly adjustable arm and a second end of the second linearly adjustable arm of each mechanical arm are pivotally coupled to the cylindrical elongated body at axially spaced apart locations along the cylindrical elongated body, whereby an axial midpoint of the cylindrical elongated body is located axially between the spaced apart locations.

2. The apparatus of claim 1, wherein:
   the elements biasing the plurality of odometers away from the cylindrical elongated body include a first spring and a second spring;
   the first linearly adjustable arm of each mechanical arm comprises a first rod slidably received within a first cylinder and the first spring, wherein the first spring is arranged to bias the first rod to an extended length out of the first cylinder; and the second linearly adjustable arm of each mechanical arm comprises a second rod slidably received within a second cylinder and the second spring, wherein the second spring is arranged to bias the second rod to an extended length out of the second cylinder.

3. The apparatus of claim 2, further comprising a first coupling formed at an end of each first rod extended out of the respective first cylinder and a second coupling formed at an end of each second rod extended out of the respective second cylinder, wherein the hinge joint of the respective mechanical arm is formed between the first coupling and the second coupling.

4. The apparatus of claim 3, further comprising a pin supported by the first and second couplings of the first and second linearly adjustable arms of each mechanical arm, wherein the odometer coupled to the mechanical arm is rotatably mounted on the pin.

5. The apparatus of claim 1, wherein the first motion device comprises a tri-axis accelerometer, and wherein the second motion device comprises a tri-axis gyroscope.

6. The apparatus of claim 1, further comprising a signal processing circuit disposed in the cylindrical elongated body and in signal communication with the odometers, the first motion device, and the second motion device.

7. The apparatus of claim 6, further comprising a data storage circuit disposed in the elongated body and in communication with the signal processing circuit.

8. The apparatus of claim 1, further comprising a coupling attached to an end of the cylindrical elongated body for coupling the elongated body to a pig.

9. A system comprising:
a pig movable through a pipeline by a fluid pressure in the pipeline;
a cylindrical elongated body coupled to the pig by a flexible joint;
a plurality of mechanical arms attached radially about the cylindrical elongated body, each mechanical arm having an adjustable angle bracket shape and a hinge joint formed at a corner of the adjustable angle bracket shape;
a plurality of odometers to measure a travel distance of the cylindrical elongated body, each odometer coupled to one of the plurality of mechanical arms at the respective hinge joint;
a first motion device mounted on the cylindrical elongated body to detect an azimuth of the cylindrical elongated body; and
a second motion device mounted on the cylindrical elongated body to detect an inclination of the cylindrical elongated body;
wherein the plurality of mechanical arms carry elements that bias the plurality of odometers away from the cylindrical elongated body,
wherein each mechanical arm comprises a first linearly adjustable arm and a second linearly adjustable arm arranged to form the adjustable angle bracket shape,
wherein a first end of the first linearly adjustable arm and a first end of the second linearly adjustable arm of each mechanical arm:
are coupled together by the respective hinge joint of the mechanical arm, and
pivot relative to each other at the respective hinge joint of the mechanical arm, and wherein a second end of the first linearly adjustable arm and a second end of the second linearly adjustable arm of each mechanical arm are pivotally coupled to the cylindrical elongated body at axially spaced apart locations along the cylindrical elongated body, whereby an axial midpoint of the cylindrical elongated body is located axially between the spaced apart locations.

10. The system of claim 9, wherein the pig is a utility pig.

11. The system of claim 10, wherein: the elements biasing the plurality of odometers away from the cylindrical elongated body include a first spring and a second spring; the first linearly adjustable arm of each mechanical arm comprises a first rod slidably received within a first cylinder and the first spring, wherein the first spring is arranged to bias the first rod to an extended length out of the first cylinder; and the second linearly adjustable arm of each mechanical arm comprises a second rod slidably received within a second cylinder and the second spring, wherein the second spring is arranged to bias the second rod to an extended length out of the second cylinder.

12. The system of claim 11, wherein a first coupling is formed at an end of each first rod extended out of the respective first cylinder;
wherein a second coupling formed at an end of each second rod extended out of the respective second cylinder; and
wherein the hinge joint of each mechanical arm is formed between the respective first coupling and the respective second coupling.

13. The apparatus of claim 12, further comprising a pin supported by the first and second couplings of the first and second linearly adjustable arms of each mechanical arm, wherein each odometer coupled to one of the mechanical arms is rotatably mounted on the respective pin of the mechanical arm.

14. A method comprising:
coupling a pig to a cylindrical elongated body of a pipeline profiler;
inserting the pig and the pipeline profiler into a pipeline;
engaging an inner wall of the pipeline by a plurality of odometers coupled to the cylindrical elongated body by a plurality of mechanical arms attached radially about the cylindrical elongated body and having adjustable angle bracket shapes, the mechanical arms carrying elements that bias the odometers away from the cylindrical elongated body;
wherein each mechanical arm comprises a first linearly adjustable arm and a second linearly adjustable arm arranged to form the adjustable angle bracket shape,
wherein a first end of the first linearly adjustable arm and a first end of the second linearly adjustable arm of each mechanical arm:
are coupled together by the respective hinge joint of the mechanical arm, and
pivot relative to each other at the respective hinge joint of the mechanical arm, and
wherein a second end of the first linearly adjustable arm and a second end of the second linearly adjustable arm of each mechanical arm are pivotally coupled to the cylindrical elongated body at axially spaced apart locations along the cylindrical elongated body, whereby an axial midpoint of the cylindrical elongated body is located axially between the spaced apart locations,
propelling the pig and pipeline profiler along the pipeline by a fluid pressure in the pipeline;
during the propelling, measuring a distance traveled by the pipeline profiler by the plurality of odometers;

during the propelling, detecting an acceleration of the pipeline profiler by a first motion device mounted on the cylindrical elongated body; and during the propelling, detecting an orientation of the pipeline profiler by a second motion device mounted on the cylindrical elongated body.

15. The method of claim 14, further comprising determining a profile of the pipeline from outputs of the odometers, first motion device, and second motion device.

16. The method of claim 14, further comprising scraping the inner wall of the pipeline by the pig during the propelling.

* * * * *